V. SAAM.
VALVE FOR PNEUMATIC TIRES.
APPLICATION FILED MAR. 31, 1913.
1,120,088.
Patented Dec. 8, 1914.
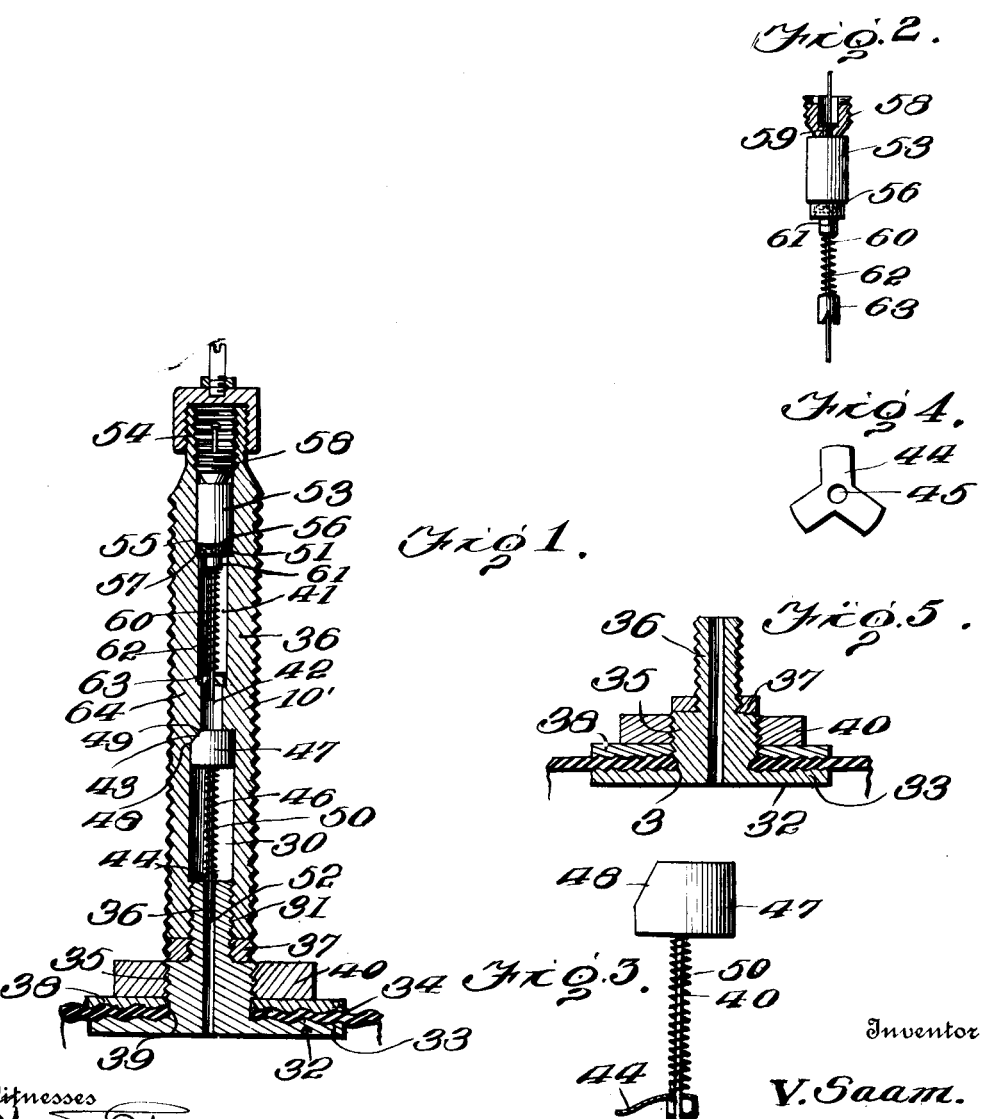

UNITED STATES PATENT OFFICE.

VALENTINE SAAM, OF ROCHESTER, MINNESOTA.

VALVE FOR PNEUMATIC TIRES.

1,120,088.  Specification of Letters Patent.  Patented Dec. 8, 1914.

Application filed March 31, 1913. Serial No. 757,988.

*To all whom it may concern:*

Be it known that I, VALENTINE SAAM, citizen of the United States, residing at Rochester, in the county of Olmsted and State of Minnesota, have invented certain new and useful Improvements in Valves for Pneumatic Tires, of which the following is a specification.

This invention relates to an improvement in valves for pneumatic tires.

The primary object of the invention is to provide a valve for pneumatic tires which is dust-proof and in which the mechanism which constitutes the check valve may be readily removed for the purpose of repair.

A still further object of the invention is to provide a check valve mechanism which will prevent the return of air through the valve stem between the strokes of the pump.

Another object of the invention is to provide a valve structure which may be readily removable from the tube when the same becomes punctured, thus permitting valve mechanisms to be interchanged when the new tubes are applied to the wheel.

For a full understanding of the invention, reference is to be had to the following description and accompanying drawing, in which:

Figure 1 is a vertical sectional view showing my improved valve assembled in operative position; Fig. 2 is a detail view of one of the valve mechanisms employed, said mechanism being shown detached; Fig. 3 is a detail view of another valve mechanism employed and arranged to co-act with said first mentioned valve mechanism, the valve mechanism illustrated in this figure being also shown detached; Fig. 4 is a detail view of the stop for the spring of the valve member illustrated in Fig. 3; and Fig. 5 is a detail sectional view of the tube engaging member shown in Fig. 1.

Corresponding and like parts are referred to in the following description and indicated in all the views of the drawing by the same reference characters.

Referring more particularly to the drawing, the stem 10' of my improved valve is provided with a bore 30 threaded as at 31 adjacent the base of the stem. The tube engaging portion 32 consists of a disk 33 formed with ribs or corrugations 34 disposed to contact with the tube. The disk is provided with a threaded extension 35 which has a reduced threaded extension 36. The reduced extension 36 is received within the threaded bore 30 of the stem 10', a packing ring 37 being interposed between the lower end of the stem 10' and the extension 35. A washer 38 is arranged on the threaded extension 35 which is reduced as at 39 to receive the tube, the washer being provided with a corrugated face disposed to engage the tube. A jam nut 40 is threaded on the extension 35, said jam nut contacting with the washer and maintaining the same in engagement with the tube.

The bore 30 is connected with the bore 41 by a restricted passage 42, the valve seat 43 in this manner being formed. A conical disk 44 is seated on the terminal of the extension 36, said disk being formed with a central aperture 45 through which a plunger wire 46 extends. A head 47 is arranged on this plunger wire, said head being formed with a beveled portion 48 which contacts with a beveled portion 49 of the stem 10' adjacent the passage 42. A coiled spring 50 is arranged between the head 47 and the disk 44, said spring embracing the plunger wire 46 and maintaining the head 47 in contact with the seat 43. A wire 52 is passed transversely through the plunger wire 46 below the disk 44, thereby preventing the wire from passing through the disk, the plunger, however, being free to move through said disk.

The upper terminal of the stem 10' is provided with the threaded extension 54 which receives the small dust cap. The bore 36 is enlarged as at 55 and a packing 56 of leather is arranged within said bore, said packing seating against the shoulder 57 formed by enlarging the bore. A plug 53, preferably formed of brass is arranged above the packing. A plug 58 is threaded within the bore 41, said plug contacting with the metallic plug 53, holding the metallic plug in contact with the packing 56 and maintaining the packing flush with the shoulder.

The brass plug is provided with a sleeve 59 which extends within the plug 58, the sleeve and plug, as well as the packing 56, being formed with a bore through which the plunger wire 60 is disposed to reciprocate. This plunger wire extends through the plug 58 to the terminal of the threaded extension 54. A head 61 is arranged on the plunger wire, the head being maintained in contact with the packing 56 by means of a coiled spring 62 which is interposed between said head and a stop 63 which contacts with the shoulder 64 formed by reducing the bore of the stem.

It will be noted by this construction that a plurality of valves are arranged one above the other, thereby assuring a proper closure for the stem and preventing leakage of air from the tube. It is also obvious that the valve will readily respond to the in-rushing air as the tire is inflated, and that it will positively prevent the escape of air which often occurs when the tube of a pump is removed from the threaded extension of the stem which receives the same.

The many advantages of this construction will be clearly apparent, as it will be noted that the device may be readily attached to the tube and the rim of a wheel, thereby allowing the valves to be readily interchanged as new tubes are applied to the wheel.

It will be noted that the base members of the barrel stems may be made of any suitable form, being flat, oval or round, and that they may be provided with either V-shaped grooves or any suitable means to support the stem against displacement.

The construction is applied to the outer casing and rim in the usual way and particular attention is called to the manner of assembling the various parts, whereby the valve may be readily taken apart for the purpose of repair. It will also be noted that the valve may be readily assembled on the tube, the arrangement being such that the escape of air is prevented and the valve only actuated when air is actually being supplied to the tube or when it is desired, by depression of the plunger wire, to allow the air to escape from the tube.

Having thus described my invention, what I claim as new and desire to secure by Letters Patent is:

1. A valve for inner tubes including a base member, a stem carried thereby, said stem being formed with a bore provided with a valve seat formed with one face inclined, a disk arranged within the bore, a spring pressed valve mounted in the bore and guided by said disk, said valve being formed with a head having one face inclined and normally seating against the inclined face of the valve seat, and a valve arranged in the stem exteriorly of said first mentioned valve.

2. A valve for inner tubes including a base member, a stem carried thereby, said stem being formed with a double diametered cylindrical bore providing a valve seat, said seat having one face inclined, a conical disk arranged within the bore, a spring pressed valve mounted in the bore and guided by said disk, said valve being provided with a cylindrical head normally resting against the valve seat, said head being formed with one face inclined and disposed to rest against the inclined face of the valve seat, and a valve arranged in the stem exteriorly of said first mentioned valve.

3. A valve for inner tubes including a base member, a stem carried thereby, said stem being formed with a bore, a valve arranged within the bore, and a second valve arranged therein, said last mentioned valve being spring pressed and including a packing rigidly supported within the bore, a member resting on said packing, a plug adjustably engaging the stem and disposed to bear against said member, said valve being formed with a head normally seating against the packing.

4. A valve for inner tubes including a base member, a stem carried thereby, said stem being formed with a bore, a valve arranged within the bore, and a second valve arranged therein, said last mentioned valve including a packing rigidly supported within the bore, a member resting on said packing, said member being formed with a sleeve, a plug engaging the stem and adapted to force said member into contact with the packing, said valve being formed with a head adapted to seat against the packing and a plunger rod disposed to extend through the packing, the member and the plug, said rod being received in the sleeve formed on said member, a stop engaging the valve stem, and a spring surrounding the plunger rod and disposed between said stop and the head, said spring normally maintaining the head seated against the packing.

5. A valve for inner tubes including a base member, a stem carried thereby, said stem being formed with a bore provided with a valve seat having a transversely extending face and an inclined face, a spring pressed valve mounted in the bore, said valve being formed with a head having one face disposed to contact with the transversely extending face of the valve seat and being provided with an inclined face disposed to seat against the inclined face of the valve seat, and a valve arranged in the stem exteriorly of said first mentioned valve.

6. A valve for inner tubes including a base member, a stem carried thereby and provided with a bore, a valve arranged to seat in said bore, said valve including a head having a stem formed thereon, a stop having slidable connection with the stem, said stop including a body portion having radially disposed arms formed thereon, a spring surrounding the stem and disposed between the head and said stop, and a valve arranged in the stem exterior of said first mentioned valve.

In testimony whereof I affix my signature in presence of two witnesses.

VALENTINE SAAM. [L. S.]

Witnesses:
R. C. NORVELL,
I. B. HOLM.